Jan. 14, 1969  P. LAUCK III  3,422,244

ELECTRIC BLANKET WITH A TEMPERATURE RESPONSIVE CONTROL CIRCUIT

Filed May 10, 1965

INVENTOR
PETER LAUCK III

BY Semmes & Semmes
ATTORNEYS

United States Patent Office 3,422,244
Patented Jan. 14, 1969

3,422,244
ELECTRIC BLANKET WITH A TEMPERATURE
RESPONSIVE CONTROL CIRCUIT
Peter Lauck III, Princeton, N.J., assignor of forty percent
to Robert Holt Myers, Washington, D.C.
Filed May 10, 1965, Ser. No. 454,417
U.S. Cl. 219—212                           11 Claims
Int. Cl. H05b 3/34

ABSTRACT OF THE DISCLOSURE

An electric blanket employing a silicon controlled rectifier to control the heating element of the electric blanket, and having means to select the temperature to which it is desired to heat the sleeping area associated with use of the electric blanket. Temperature sensitive means are utilized in the control circuit connected to the silicon controlled rectifier, to control conduction of the silicon controlled rectifier and thereby the heating element current, to maintain the sleeping area temperature at the desired selected temperature. The blanket comprises a particular configuration to maximize temperature control sensitivity and blanket utility.

---

This application is concerned with an electric blanket, and more particularly with the electrical control circuit, as well as the blanket material.

The use of electric blankets is common, but in the past the temperature controls for such blankets have included electrical elements and circuits which are relatively large in size, thereby necessitating the use of a large central control box.

The electric elements heretofore used to control the temperature of electric blankets, and more particularly, disconnect the power supply from the heating element in blankets, have usually been relays, or bimetallic switches. These are large and slow acting, and do not give sensitive control within the desired temperature range. My invention is concerned with using a silicon controlled rectifier (SCR) to switch the heating current on and off, depending upon the change from the desired temperature or temperature range. The silicon controlled rectifier is small, in most cases less expensive, and for its size can handle more power.

Another part of this invention is to utilize a new type of electric blanket, which comprises three layers of different types of material. The purpose of this, is to have a blanket that will spread heat evenly throughout the blanket and direct it towards the sleeping area. Furthermore, the particular use of different types of layers of material, makes it possible for my blanket to be used as either a blanket or a bedspread, depending upon which way it is placed on the bed.

An object of the present invention is to eliminate the unsightly and space consuming bedside control box, and to utilize a printed circuit device which plugs directly into the wall outlet.

Another object of the present invention is to utilize a temperature control element that will be more sensitive than those in use in present day electric blankets, and which will be adjustable by a very small unit mounted within the binding of the electric blanket.

Another object of the present invention is to utilize a porous weave such as a thermal leno or crochet type of material for the electric blanket.

Another object of the present invention is to use a silicon controlled rectifier instead of a bimetallic switch to turn power to the heating element on and off, depending upon the temperature desired.

These and other objects of the invention will be apparent from the following specification and attached drawings.

Figure 2:
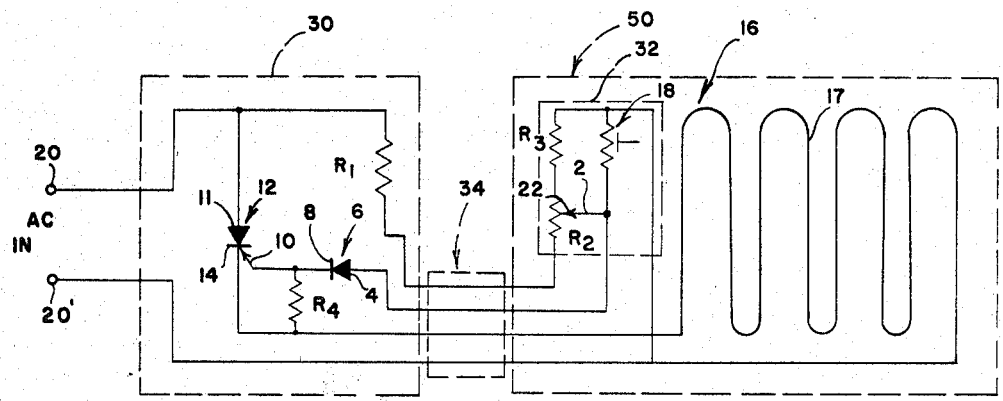
FIGURE 2 is a schematic circuit diagram of the control and heating circuits of the electric blanket.
Figure 3:
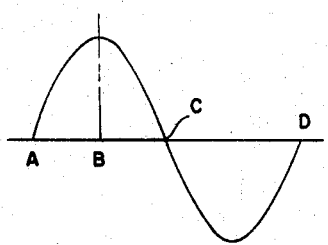
FIGURE 3 is a waveform diagram of a conventional 120 volt alternating current power supply.

FIGURE 2 illustrates the electric circuitry of this invention. Resistors R1, R2, and R3 are connected in series across a conventional 120 volt alternating current supply. The free ends of resistors R1 and R3 are respectively connected to terminals 20 and 20' of the input supply. Resistor R2 comprises a potentiometer with arm 2, the tap 22 of arm 2 being connected so as to be adjustable over resistor R2. The other end of potentiometer 2 is connected to anode 4 of blocking diode 6, which may be a Zener diode. Blocking diode 6 prevents reverse (negative) voltage from being applied between cathode 14 and gate 10 during the reverse (negative) cycle of the alternating current input. The cathode 8 of blocking diode 6 is connected to the control or gate electrode 10 of silicon controlled rectifier 12. The anode 11 of silicon controlled rectifier 12 is connected to terminal 20 of the input supply. Thermistor 18 is connected between arm 2 and terminal 20' of the input supply. The cathode 14 of silicon controlled rectifier 12 is also connected to terminal 20' of the input supply through heating element 16. As illustrated in FIGURE 2, heating element 16 comprises a series of coils 17, in series connection with the silicon controlled rectifier 12, laid out throughout layer 54 of blanket 50. Resistor R4 is connected across gate or control electrode 10 and cathode 14 of silicon controlled rectifier 12.

Figure 1:
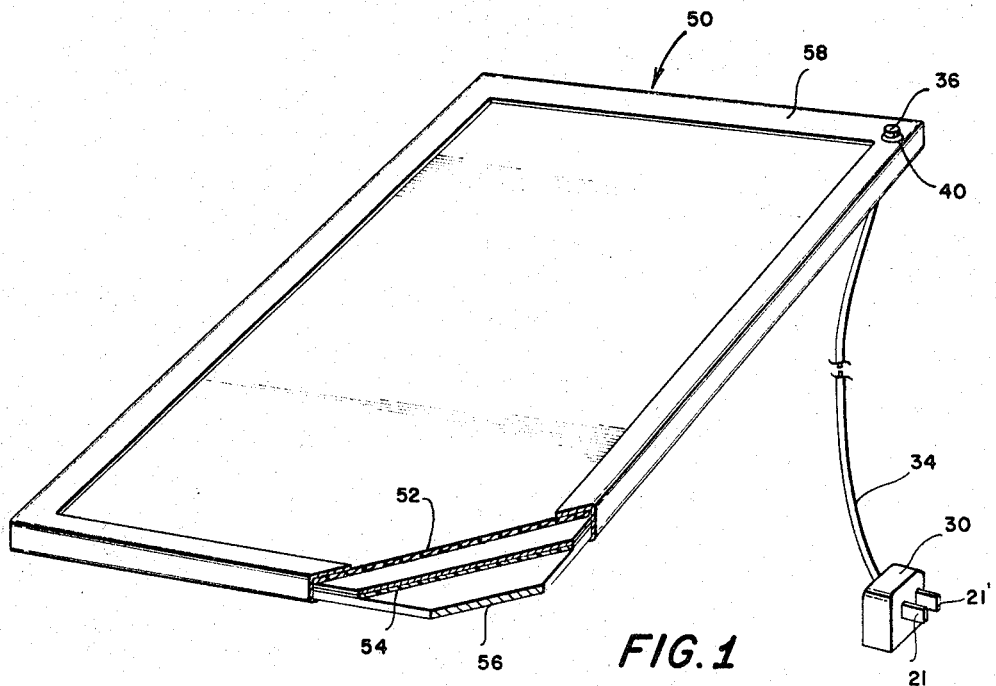
FIGURE 1 is a perspective view of the control device connected to the electric blanket via a cable.

As illustrated in FIGURE 1, the electrical elements of the circuit are housed in two distinct sections. Housing 30 comprises the silicon controlled rectifier 12, resistor R1, blocking diode 6, and resistor R4. It is small and rectangular in shape, with prongs 21 and 21' connected to terminals 20 and 20' so that it plugs directly into a conventional A.C. outlet as illustrated in FIGURE 1. The compact size of housing 30 is made possible because of the use of a printed circuit board as well as by the small size of the elements contained therein. It is connected to housing 32 via cable 34, as illustrated in FIGURES 1 and 2. Housing 32 electrically comprises resistors R2 and R3, as well as the potentiometer arm 2 and thermistor 18. Again, the use of a printed circuit board and small electrical elements, enables housing 32 to be extremely compact in size. Housing 32 is mounted in the binding 58 of the blanket, with temperature selector 36 facing outward. Control knob 36 is actually the control for the potentiometer and is adjustable over the length of resistance R2, as illustrated in FIGURE 2. It selects the desired temperature along scale 40, which is marked off by different temperatures. Housing 32 is approximately the size of a dime.

This invention also involves a particular design for the blanket 50, which provides more efficient and even heating characteristics. As illustrated in FIGURE 1, the blanket comprises three distinct layers. The first layer, designated as 52, is the top section of the blanket and is made of a regular napped textured blanket material. The second layer, designated by numeral 54, is an insulated metal-coated layer comprising printed wire circuitry within the blanket to form heating coils 17 to generate the desired heat. The third layer 56 of the blanket comprises a thermal leno or crochet open textured layer. This is distinguished by an open mesh sandwiched within aluminum coated material. It reflects the heat downward thereby controlling the body temperature underneath the blanket; that is, within the sleeping area. The third section of the blanket permits radiation of heat downward from the insulated wire layer. Thus it controls the body temperature underneath the blanket or within the sleeping area. Furthermore, the texture of the thermal leno or crochet layer resembles that of a bedspread, and thus provides a reversible blanket/bedspread, depending upon the position of layers 52 and 54 on the sleeping area.

The electrical elements cooperate in the following manner.

The setting of tap 22 on resistor R2 determines the operating temperature of the blanket. That is, knob 36 is adjusted so that it selects the desired operating temperature indicated around indicator 40, which actually is coextensive with the length of resistor R2.

Assuming that a positive half-cycle AC of the alternating current input supply is applied to terminals 20 and 20', with 20' being the ground terminal, blocking diode 6 will conduct because anode 4 will be positive with respect to cathode 8. The portion of the total current flowing through the blocking diode 6 and resistance R4 will be determined by the setting of resistance R2. A minimum amount of current or threshold gate energy must be applied to the control electrode 10 in order to start silicon controlled rectifier 12 conducting. By varying the setting of resistor R2 the threshold gate energy will or will not be applied to control or gate electrode 10.

Assuming that the setting of resistor R2 and tap 22 of the potentiometer is such that enough current is transmitted through the blocking diode 6 to control or gate electrode 10 so that the threshold gate energy is reached, silicon controlled rectifier 12 will then begin to conduct. Current will flow from anode 11 to cathode 14 through heating element 16 to the input ground. As the heating element is fed through silicon controller rectifier 12, it will increase its temperature. This temperature will be sensed by thermistor 18, which decreases in resistance as it increases in temperature.

As the input supply begins its positive half cycle swing (AC), the current or gate energy supplied to control or gate electrode 10 will progressively increase as the voltage increases from A to B. The setting of resistance R2 and the resistance of the thermistor 18 will control the gate energy applied under such conditions to control or gate electrode 10. It will thus determine the point in the positive half cycle at which the threshold gate energy is reached, at which point the silicon control led rectifier 12 will begin conducting. Of course, the setting of resistor R2, and the resistance of thermistor 18 as affected by the heating element 16, may be such that thermistor 18 shunts most of the current. Under such circumstances, the threshold gate energy will not be reached and the silicon controlled rectifier will not operate for any portion of the positive half cycle.

Assuming, for example, a theoretical resistance of zero for thermistor 18, it will obviously shunt all the current from tap 22, because it will be a short circuit. Under such circumstances, of course, no current will flow to control electrode 10, and the silicon controlled rectifier will therefore not reach its gate energy which is necessary for it to begin operation. Thus, the setting of resistor R2 will determine the amount of gate energy applied to the control electrode initially and thermistor 18 will control the gate energy applied to control electrode thereafter according to the temperature of heating element 16. If the temperature of the heating element increases so as to exceed the desired temperature, thermistor 18 will shunt enough current so silicon controlled rectifier 12 will not begin operating again when a positive half cycle is applied to the circuit. Then, due to thermal lag, the blanket will slowly cool down, until the thermistor, and more particularly the resistance of the thermistor, allows the silicon controlled rectifier to again begin conducting. Thus, the temperature of the blanket can be controlled, e.g. to within a few degrees of temperature selector setting.

Assume now that the negative half cycle CD of the alternating current input is applied to the circuit. Then neither blocking diode 6 nor silicon controlled rectifier 12 will conduct because their anodes will be negative with respect to their respective cathodes. However, as the input shifts again to positive half cycle, blocking diode 6 would then begin to conduct. Then, depending upon the setting of resistor R2 (the desired temperature), and the resistance of thermistor 18 (the actual temperature), the silicon controlled rectifier 16 will or will not conduct.

As the resistance of thermistor 18 increases, due to a falling actual temperature, less current will flow through thermistor 18 and, when the threshold gate energy of control electrode 10 is again reached, because of the increase in current to control electrode 10, silicon controlled rectifier 12 will again begin operating when positive half cycles are applied. It must be emphasized that once the threshold gate energy is applied to silicon controlled rectifier 12, said rectifier will operate throughout the positive half cycle, even if the gate energy falls below the threshold value, and will shut off when the negative half cycle is applied to the input.

Having thus described my invention, I claim the following:

1. An electric blanket having blanket heating element and a power supply therefor which comprises:
   (A) a silicon controlled rectifier having an anode, cathode and control electrode, said anode being connected to one terminal of a power supply, said cathode being connected to the other terminal of said power supply through the blanket heating element;
   (B) temperature responsive means responsive to the temperature under said blanket to vary the gate energy of said control electrode to thereby vary the conduction time of said silicon controlled rectifier, whereby the current through said heating element will vary according to the temperature under said blanket.

2. An electric blanket having blanket heating element and a power supply therefor which comprises:
   (A) a silicon controlled rectifier having an anode, cathode and control electrode, said anode being connected to one terminal of a power supply, and said cathode being connected to the other terminal of said power supply through a blanket heating element;
   (B) a variable resistance connected across said power supply, in parallel with said silicon controlled rectifier and said heating element;
   (C) means responsive to said variable resistance to vary the voltage at said control electrode, and thereby change the conduction time of said silicon controlled rectifier to vary the heating effect of said heating element.

3. An electric blanket having a heating element which comprises:
   a power supply having first and second terminals,
   a silicon controlled rectifier having an anode, cathode and control electrode, said anode being connected to the first terminal of said power supply, and said cathode being connected to the second terminal of said power supply through the heating element;
   variable resistance means connected across said power supply, in parallel with said silicon controlled rectifier and said heating element;
   a resistor connected across said control electrode and said cathode;
   a blocking diode, having an anode, connected to said variable resistance means, and a cathode connected to said control electrode;
   a temperature responsive thermistor sensor having a negative temperature coefficient, one terminal of said sensor being connected to the second terminal of said power supply, the other terminal of said sensor being connected to the anode of the blocking diode, and the variable resistance means;
   whereby the gating energy applied to said control electrode may be varied by varying said variable resistance means, and whereby increases in temperature will decrease the resistance of said sensor, and thereby decrease said gating energy for a predetermined setting of said variable resistance means.

4. An electric blanket having a heating element which comprises:
- a power supply having first and second terminals;
- a silicon controlled rectifier having an anode, cathode and control electrode, said anode being connected to the first terminal of said power supply, and said cathode being connected to the second terminal of said power supply through the heating element;
- a potentiometer connected across said power supply in parallel with said silicon controlled rectifier and said heating element, said potentiometer comprising a first resistor having an arm with a tap, the terminals of said first resistor being connected between the first and second terminals of the power supply;
- a blocking diode comprising an anode connected to said arm of said potentiometer, and a cathode connected to said control electrode;
- a second resistor connected across said silicon controlled rectifier cathode and control electrode;
- a temperature responsive thermistor sensor having two terminals, one terminal of said sensor being connected to said second terminal of said power supply, the other terminal of said sensor being connected to the arm of said potentiometer; whereby when a positive half cycle of alternating current is supplied by the power supply, the silicon controlled rectifier will conduct for the remaining portion of a positive half cycle after which energy at least equal to the threshold gate energy of the silicon controlled rectifier is applied to said control electrode.

5. The electric blanket as described in claim 1 wherein:
- the heating element comprises a series of coils formed of printed wire circuitry within an insulated metal-coated layer,
- a napped textured blanket material contiguous to one side of said insulated metal-coated layer,
- a thermal leno open textured layer to reflect heat downwards toward the sleeping area contiguous to the other side of said insulated metal-coated layer.

6. An electric blanket having a heating element which comprises:
- a power supply having first and second terminals;
- a silicon controlled rectifier having an anode, cathode and control electrode, said anode being connected to the first terminal of said power supply, and said cathode being connected to the second terminal of said power supply through the blanket heating element.
- a first, second and third resistor connected in a series across the power supply, in parallel with said silicon controlled rectifier and said heating element;
- a potentiometer arm variable across said second resistor said arm and said second resistor forming a potentiometer;
- a blocking diode comprising an anode connected to said potentiometer arm, and a cathode connected to said control electrode;
- a fourth resistor connected across said silicon controlled rectifier cathode and said control electrode;
- a temperature responsive thermistor sensor having two terminals, one terminal of said sensor being connected to said second terminal of said power supply, the other terminal of said sensor being connected to the potentiometer arm, whereby when a positive half cycle of alternating current is applied to said terminals the silicon controlled rectifier will conduct for the remaining portion of the positive half cycle after which energy at least equal to the threshold gate energy is applied to said control electrode.

7. The electric blanket as described in claim 6, wherein said silicon controlled rectifier, said blocking diode, said first and fourth resistances are housed in a first small housing, the electrical elements in said first housing being interconnected via a printed circuit board;
and wherein said third resistor, said potentiometer and said thermistor are contained in a second small housing within the binding of the blanket, said first and second housings being interconnected by a cable;
and wherein said heating element comprises a series of printed wire coils arranged throughout the blanket to heat the sleeping area.

8. The electric blanket as described in claim 6 wherein:
the heating element comprises a series of coils formed of printed wire circuitry within an insulated metal-coated layer;
a napped textured blanket material contiguous to one side of said insulated metal-coated layer;
a thermal leno open textured layer to reflect heat downward toward the sleeping area contiguous to the other side of said insulated metal-coated layer.

9. An electric blanket which comprises the following layers in contiguous relationship:
a first layer comprising napped textured blanket material;
a second layer comprising an insulated metal-coated layer comprising printed wire circuitry within said layer in the form of heating coils;
a third layer comprising a thermal leno open textured layer to reflect heat downward toward the sleeping area, said third layer is made of a porous weave in the form of an open mesh which is sandwiched within an aluminum-coated material.

10. An electric blanket which comprises:
a power supply having first and second terminals,
a silicon controlled rectifier having an anode, a cathode, and a gate,
a heating element connected in series with the silicon controlled rectifier between the first and second terminals of the power supply,
variable resistor means connected between the first and second terminals of the power supply,
a temperature responsive element connected between the gate and one of the first and second terminals of said power supply.

11. An electric blanket which comprises:
a power supply having first and second terminals,
a silicon controlled rectifier having an anode, a cathode, and a gate,
a heating element connected in series with the silicon controlled rectifier between the first and second terminals of the power supply,
a potentiometer having a first resistor connected between the first and second terminals of the power supply and a tap connected to the gate,
a temperature responsive thermistor having a negative temperature coefficient connected between the tap and one of said first and second terminals of the power supply.

References Cited

UNITED STATES PATENTS

| | | | |
|---|---|---|---|
| 2,262,336 | 11/1941 | Samuels | 219—529 |
| 2,735,926 | 2/1956 | Langlois | 219—528 |
| 2,745,942 | 1/1956 | Cohen | 219—528 |
| 2,889,445 | 6/1959 | Wolf | 219—549 |
| 2,928,927 | 3/1960 | Taylor | 219—212 |
| 2,967,924 | 1/1961 | Friend | 219—494 |
| 3,068,338 | 12/1962 | Bigler | 219—494 |

VOLODYMYR Y. MAYEWSKY, *Primary Examiner.*

U.S. Cl. X.R.

219—494, 549, 543, 501

UNITED STATES PATENT OFFICE
CERTIFICATE OF CORRECTION

Patent No. 3,422,244                        January 14, 1969

Peter Lauck III

It is certified that error appears in the above identified patent and that said Letters Patent are hereby corrected as shown below:

In the heading to the printed specification, lines 4 and 5, "assignor of forty percent to Robert Holt Myers, Washington, D. C." should read -- assignor, by mesne assignments, to J. P. Stevens & Co., Inc., New York, N. Y., a corporation of Delaware --.

Signed and sealed this 17th day of March 1970.

(SEAL)
Attest:

Edward M. Fletcher, Jr.                    WILLIAM E. SCHUYLER, JR.

Attesting Officer                        Commissioner of Patents